United States Patent [19]

Masuda et al.

[11] Patent Number: 4,692,613
[45] Date of Patent: Sep. 8, 1987

[54] ANGLE SENSOR

[75] Inventors: Sumio Masuda, Tokyo; Hiroshi Iiyama; Kazuyuki Tamura, both of Kanagawa, all of Japan

[73] Assignee: Jeco Co., Ltd., Kawasaki, Japan

[21] Appl. No.: 724,092

[22] Filed: Apr. 17, 1985

[30] Foreign Application Priority Data

Apr. 24, 1984 [JP] Japan .................. 59-81212

[51] Int. Cl.⁴ ............................. G01D 5/34
[52] U.S. Cl. .................... 250/231 SE; 356/152
[58] Field of Search .......... 250/206, 211 R, 211 J, 250/211 K, 231 SE, 231 R; 350/266, 269, 271, 273, 274; 356/141, 152; 116/215

[56] References Cited

U.S. PATENT DOCUMENTS

| | | | |
|---|---|---|---|
| 1,163,594 | 12/1915 | Fry | 356/20 |
| 2,989,642 | 6/1961 | Svec | 250/231 SE |
| 3,480,788 | 11/1969 | Barbieri et al. | 250/231 R |
| 3,483,391 | 12/1969 | Jensen | 250/231 R |
| 3,742,233 | 6/1973 | Gorgens et al. | 250/231 R |
| 3,800,162 | 3/1974 | Lueck et al. | 250/231 R X |
| 3,859,651 | 1/1975 | Thomas, Jr. | 116/215 X |
| 4,114,035 | 9/1978 | Herzog | 250/211 K |

FOREIGN PATENT DOCUMENTS

| | | | |
|---|---|---|---|
| 0045510 | 3/1983 | Japan | 356/372 |
| 0140117 | 7/1985 | Japan | 250/231 R |

Primary Examiner—Eugene R. Laroche
Assistant Examiner—David Mis
Attorney, Agent, or Firm—Blakely, Sokoloff, Taylor & Zafman

[57] ABSTRACT

A light shielding plate rotated by the shaft of an object to be measured is provided with a slit. The distance between the slit and the axis of the shaft varies continuously. A light source and a linear light receiving element are disposed on opposite sides of the light shielding plate.

6 Claims, 11 Drawing Figures

ANGLE SENSOR

BACKGROUND OF THE INVENTION

This invention relates to an angle sensor utilizing light.

According to a conventional method of detecting an rotation angle, a shaft of a potentiometer is rotated in accordance with a rotation angle of an object to be measured for detecting the rotating angle based on the variation of the resistance value of the potentiometer caused by the rotation. According to this method, however, due to the sliding friction of the potentiometer where the torque applied to the potentiometer is small, a large error occurs. For example, in a method of detecting the inclination angle by measuring the rotaton angle of a pendulum, for the purpose of decreasing the error, it is necessary to make sufficiently large the rotational moment of the pendulum so that it is difficult to construct such device to have a small size and to obtain a desired response characteristic. Another defect of the method of utilizing the potentiometer lies in a short life caused by friction.

To eliminate these defects it is necessary to measure the rotating angle of an object without touching the same so that methods of utilizing magnetic field or light have been proposed.

The apparatus utilizing magnetic field is constituted by a sensor which senses magnetism such as a magnetic resistance element or a Hall element, but where such apparatus is used in an enviromnment in which external magentic field exists the measured value is influenced by the external magentic field thereby causing error. For this reason, in a certain case it is necessary to provide a magentic shield.

On the other hand, where light is used, it is only necessary to shield light for obviating the influence caused by external light, and this measure is much feasible than the magnetic shield. For this reason, it is more advantageous to use light than magnetic field to avoide the effect cause by external disturbance.

FIG. 1 shows a basic construction of a prior art angle sensor utilizing light. As shown, a luminous diode 1 acting as a luminous element and a phototransistor 2 acting as a light receiving element are disposed coaxially with a suitable gap therebetween. The luminous diode 1 and the phototransistor 2 are disposed in a casing, not shown. This apparatus is constructed such that when a semicircular or sector shaped light shielding plate 4 supported by a shaft 3 is rotated its straight side 4A intersects the optical axis. With this construction, as the rotation angle of the shaft 3 varies, the light quantity reaching the phototransistor 2 varies so that a signal corresponding to the rotation angle can be produced as shown in FIG. 2. Generally, however, the light receiving surface of th phototransistor is small, with the result that as the rotation angle varies only a little, the state changes from a range A in which the incident light is perfectly intercepted to a range B in which the incident light is not intercepted as shown in FIG. 2, thus saturating the output. Accordingly, a linear output characteristic can be obtained only in a very narrow region C. Where a phototransistor having a large light receiving area is used, the linear region (C in FIG. 2) can be increased to a certain extent, but such phototransistor is a special one so that its cost of manufacturing is high and not economy. Since it is impossible to make infinitely large the light receiving area the maximum detection angle was only 5°–6°. The shape of the output characteristic curve shown in FIG. 2 is inherent to the principle of the angle sensor shown in FIG. 1 so that this shape can not be changed as desired. For this reason, it has long been desired to provide an angle sensor utilizing light capable of obviating the defects of the prior art.

SUMMARY OF THE INVENTION

It is a principal object of this invention to provide an improved angle sensor utilizing light having a simple construction and can be manufactured at a low cost, yet capable of obtaining any desirable output characteristic over a wide range of measuring angles.

According to this invention there is provided an angle sensor comprising a shaft rotated by an object to be measured, a light shielding member rotated by the shaft and formed with a slit, the distance between the slit and the axis of the shaft varying continuously in the peripheral direction of the light shielding member, and linear light receiving means disposed to receive light from a light source passing through the slit.

DESCRIPTION OF THE PREFERRED EMBODIMENTS

Figure 1:
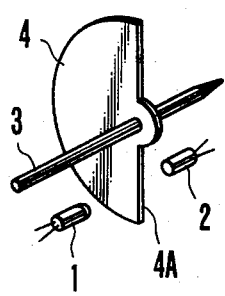
FIG. 1 is a perspective view showing a prior art angle sensor utilizing light.
Figure 2:
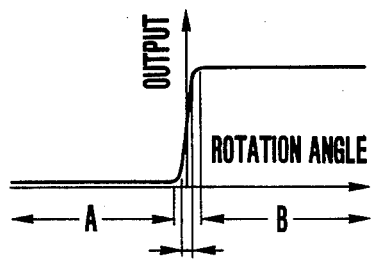
FIG. 2 is a graph showing the relation between the angle and the output signal characteristic.
Figure 3:
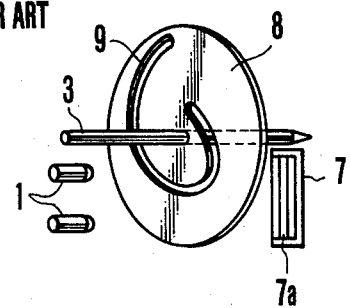
FIG. 3 is a perspective view showing one embodiment of a angle sensor embodying the invention.

In a preferred embodiment of this invention shown in FIG. 3, parts corresponding to those shown in FIG. 1 are designated by the same reference characters. In Fig. 3, 7 represents a light point position detecting element having a linear light receiving element. As the light point position detecting element 7 can be used any one of varior prior art elements. For example, in this embodiment, the linear light receiving element 7a in made of CdS which is a photoconductor. The light point position detecting element 7 is constituted by a linear light receiving element 7a made of CdS and sandwiched between a metal film resistor and a metal electrode which have substantially the same length. When light is projected upon one point of the light receiving element 7a while applying voltage across lead wires attached to both ends of the metal film resistor in the longitudinal direction thereof, current flows through the lighted point so as to function like a sliding contact of a conventional potentiometer, thereby producing an output voltage from the electrode representing the position of the lighted point.

In FIG. 3, the light point detection element 7 is secured such that its light receiving element 7a will lie on a line perpendicular to the axis of the shaft 3. On the opposite side of the light receiving element 7a are disposed luminous diodes 1. A light shielding plate 8 supported by the shaft 3 is positioned in a gap between the luminous diodes 1 and the light point position detecting element 7. The light shielding plate 8 is formed with a spiral slit 9. The luminous diodes 1 are arranged with respect to the light shieldig plate 8 so as to give a sufficiently large brightness along the radius thereof.

Figure 4:
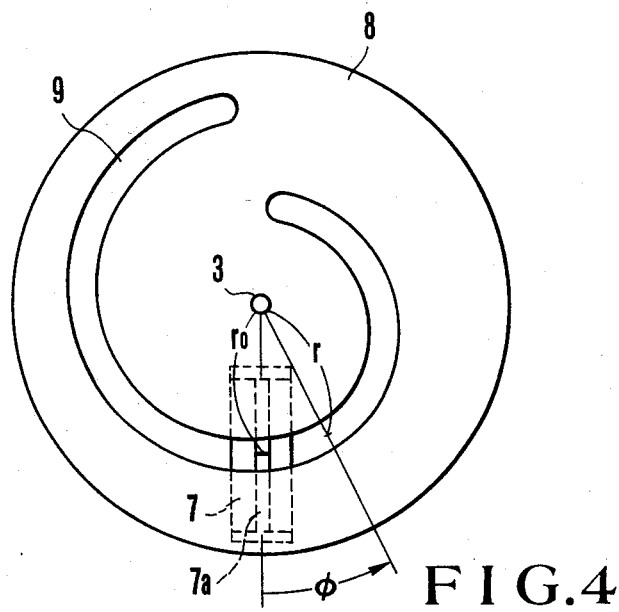
FIGS. 4, 6 and 8 are plan views showing three examples of the light shielding plate of the embodiment shown in FIG. 3.

FIG. 4 is a front view of the light shielding plate 8 showing the construction thereof. The distance between the slit 9 and the axis of shaft 3 is determined by the following equation with reference to the peripheral angle $\phi$ of the light shielding plate 8

$$r = r_o - k\phi \qquad \ldots (1)$$

when $r_o$ and k are constants of which $r_o$ represents the distance between the center of the light point position detecting element 7 and the axis of shaft 3.

Figure 5:
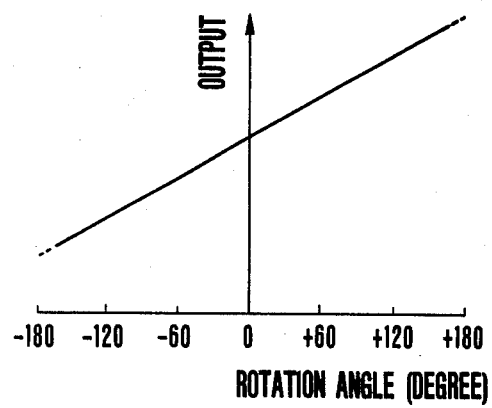
FIGS. 5, 7 and 9 are graphs respectively showing the relationships between the angles and the output signal characteristics when the light shiedling plates shown in FIGS. 4, 6 and 8 are used.

In operation, since the light emitted by the luminous diodes 1 passes through the slit 9 to illuminate the light receiving element 7a of the light point position detection element 7 so that when the light shielding plate 8 is rotated, the illuminated position on the light receiving element 7a varies. At this time, since the luminous diodes 1 irradiate a radious of the light shielding plate with a sufficient brightness, the light receiving element 7a of the light point position detecting element 7 is illuminated with a sufficiently large brightness regardless of the position of the lighted point. Furthermore, as the lighted position of the light receiving element 7a corresponding to the rotation angle is defined by equation (1), the angle sensor of this invention can produce a signal proportional to the rotation angle over angles of approximately 360° as shown in FIG. 5.

Figure 6:
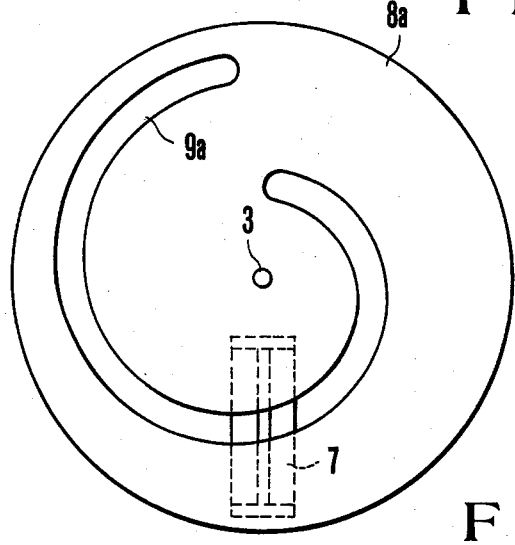
Figure 7:
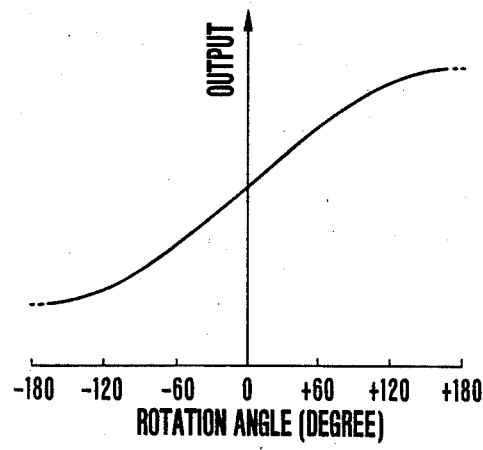

FIG. 6 is a plan view showing a modified light shielding plate 8a in which near 0° rotation angle, variation in the slit position with reference to the peripheral angle variation is made to be large to effect a high resolution detection but in another portions the slit position variation with respect to the peripheral angle variation is made small for effecting a relatively low resolution detection. In this modification, the slit 9a is formed such that the distance thereof from the axis of the shaft 3 satisfies the following equation (2). Then the relation between the rotation angle $\theta$ and the output signal Vo can be expressed by the following equation (3)

$$r = f(\phi) \qquad \ldots (2)$$

$$Vo = \alpha f(-\theta) + \beta \qquad \ldots (3)$$

where $\alpha$ and $\beta$ represent constants. With this slit construction, an output characteristic as shown in FIG. 7 can be obtained.

Figure 8:
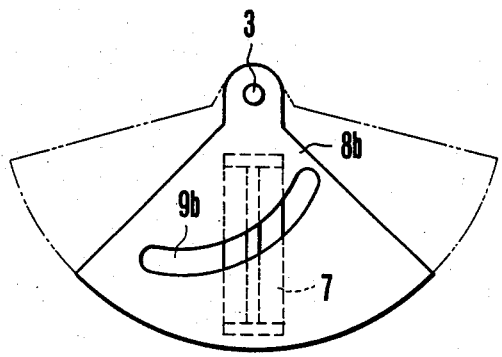
Figure 9:
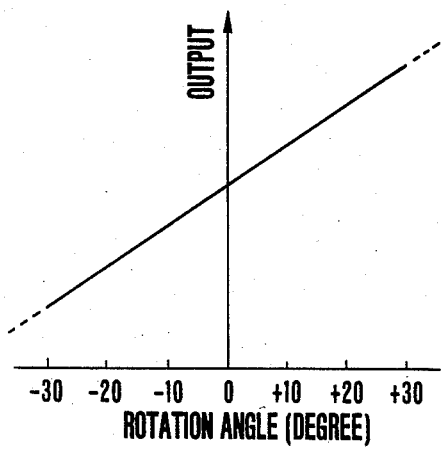

FIG. 8 shows another modificiation of the light shielding plate 8b which can be used where the range of the rotation angle to be detected may be relatively narrow. In this modification, the light shielding plate 8b takes the form of a sector having angles of 90°. Assuming a detection range of 60°, for example, the light shielding plate can move in a range shown by dot and dash lines so that the size of the angle sensor can be made to be less than ½ of the first and second embodiments. When the slit 9b is formed at a position satisfying equation (2), a linear output characterisitc as shown in FIG. 9 can be obtained.

Figure 10:
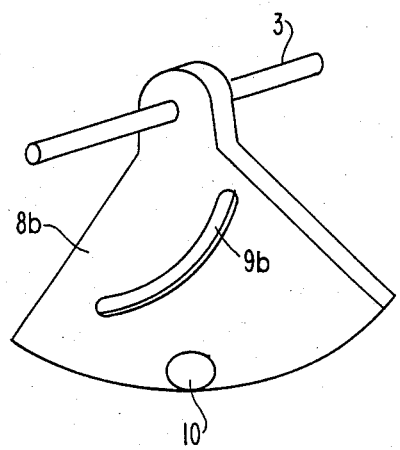
FIG. 10 is a perspective view of another embodiment of the present invention.

In FIG. 10, there is shown an embodiment of the present inventition wherein the shaft 3 is supported by a low friction bearing (not shown) and a weight 10 is provided for light shielding plate 8b to provide a bias force to the plate 8b in a definite direction.

Figure 11:
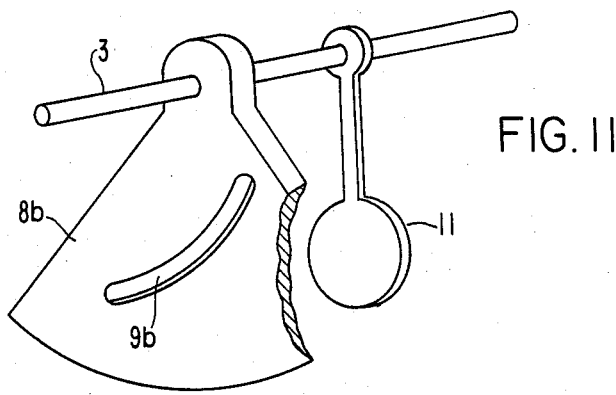
FIG. 11 is a perspective view of still another embodiment of the present invention.

In FIG. 11 there is shown another embodiment of the present invention wherein a pendulum is provided for the shaft 3 so as to apply a bias force to the plate 8b in a definite direction. Both embodiments of the present invention shown in 10 and 11 can be used as an inclination angle sensor.

It should be understood that the configuration of the light shielding plate is not limited to a circle or sector and that any peripheral configuration can be used. It is only necessary to use a light shielding plate having a slit whose distance from the axis of a rotary axis varies continuously, where the position of the slit is adequately selected, the relation between the rotation angle and the output signal can be made to have any disired characteristic and moreover, the measuring range of the rotation angle can be made wide or narrow. For a small range of detection, a small light shielding plate is sufficient, thus minimizing the size of the angle sensor.

According to this invention, since a light point position detection element having a linear light receiving element is used the angle sensor can be manufactured readily with low cost.

What is claimed is:

1. An angle sensor comprising:
   a horizontal shaft rotated by an object at a rotation angle which is to be measured;
   a disc shaped light shielding member penetrated by said shaft at a center thereof, rotated about said shaft and formed with a spiral slit, a distance between said slit and an axis of said shaft increasing uniformly from a first slit end to a second slit end, said first and second slit ends being first and second distances from said shaft, respectively, said second distance being greater than said first distance;
   a light source for illuminating one side of said light shielding member;
   a single linear light receiving means which is capable of determining a longitudinal position thereof on which a light beam from said light source strikes, said linear light receiving means being disposed on the opposite side of said light source with respect to said light shielding member in such manner that a longitudinal axis line of said light receiving means coincides with a line which is orthogonal to and includes the axis of said shaft and is parallel to the surface of said light shielding member, said linear light receiving means having a predetermined length so that when said light shielding member is rotated by said object, light passing through said first and second slit ends each are received, respectively, by opposite end portions of said light receiving means; and
   a weight coupled to said light shielding member.

2. The angle sensor according to claim 1 wherein the rate of variation of the distance between said slit and the axis of said shaft changes along said slit.

3. The angle sensor according to claim 1, wherein said spiral slit surrounds said shaft at least 360 degrees.

4. An angle sensor comprising:
   a horizontal shaft rotated by an object at a rotation angle which is to be measured;
   a disc shaped light shielding member penetrated by said shaft at a center thereof, rotated about said shaft and formed with a spiral slit, a distance between said slit and an axis of said shaft increasing uniformly from a first slit end to a second slit end, said first and second slit ends having first and second distances from said shaft, respectively, said second distance being greater than said first distance;

a light source for illuminating one side of said light shielding member;

a single linear light receiving means which is capable of determining a longitudinal position thereof on which a light beam from said light source strikes, said linear light receiving means being disposed on the opposite side of said light source with respect to said light shielding member in such manner that a longitudinal axis line of said light receiving means coincides with a line which is orthogonal to and includes the axis of said shaft and is parallel to the surface of said light shielding member, said linear light receiving means having a length such that, when said light shielding member is rotated by said object, light passing through said first and second slit ends are received, respectively, by opposite end portions of said light receiving means; and a pendulum coupled to said shaft so as to maintain said light shielding member in a definite direction in relation to the gravity direction.

5. The angle sensor according to claim 4 wherein the rate of variation of the distance between said slit and the axis of said shaft change along said slit.

6. The angle sensor according to claim 4, wherein said spiral slit surrounds said shaft at least 360 degrees.

* * * * *